United States Patent
Civerolo et al.

(10) Patent No.: US 12,207,217 B2
(45) Date of Patent: Jan. 21, 2025

(54) SECURE DATA TRANSMISSION SYSTEM AND METHOD FOR TARGETING SPECIFIC RECEIVER LOCATIONS

(71) Applicant: United States Government as represented by the Secretary of the Navy, San Diego, CA (US)

(72) Inventors: Michael Civerolo, San Diego, CA (US); Nicholas Lumsden, Escondido, CA (US); Nicholas Johnson, San Diego, CA (US); Christopher Lichtenberg, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 448 days.

(21) Appl. No.: 17/650,029

(22) Filed: Feb. 4, 2022

(65) Prior Publication Data
US 2023/0254797 A1    Aug. 10, 2023

(51) Int. Cl.
*H04W 56/00* (2009.01)
*H04W 88/00* (2009.01)

(52) U.S. Cl.
CPC ....... *H04W 56/005* (2013.01); *H04W 56/006* (2013.01); *H04W 88/00* (2013.01)

(58) Field of Classification Search
CPC ..... H04W 4/00–029; H04W 8/00–245; H04W 88/00–06
See application file for complete search history.

(56) References Cited

U.S. PATENT DOCUMENTS

| | | | | |
|---|---|---|---|---|
| 2002/0015439 A1* | 2/2002 | Kohli | ............... | G01C 22/00 375/150 |
| 2006/0098760 A1* | 5/2006 | Shen | ............... | H04B 7/0697 375/299 |
| 2008/0012710 A1* | 1/2008 | Sadr | ............... | G01S 7/023 340/572.1 |
| 2008/0311858 A1* | 12/2008 | Cheng | ............... | H04B 7/0682 455/69 |
| 2010/0046491 A1* | 2/2010 | Vermani | ............... | H04L 27/2655 370/342 |
| 2010/0207820 A1* | 8/2010 | Kawano | ............... | G01S 11/02 342/393 |

(Continued)

*Primary Examiner* — San Htun
(74) *Attorney, Agent, or Firm* — Naval Information Warfare Center, Pacific; Kyle Eppele; Evan Hastings (57) ABSTRACT

A secure data transmission system and method for targeting specific receiver locations. The secure data transmission system includes a time multiplexer, a time delay unit, a receiver tacker, and a plurality of transmitters. Additionally, the secure data transmission system may include a multiplexing sequence, a digital switch, a plurality of empty vectors, a range calculator, a delay estimator, and a plurality of stream time delays. The method for targeting specific receiver location includes receiving an input data stream, multiplexing the input data steam, receiving at least one instantaneous receiver locations, calculating a plurality of transmission ranges for each of the plurality of output data streams, calculating a plurality of time delays for each of the plurality of output data streams, delaying each of the plurality of output data streams according its calculated time delay, and transmitting each of the plurality of output data streams.

8 Claims, 8 Drawing Sheets

(56) References Cited

U.S. PATENT DOCUMENTS

| | | | |
|---|---|---|---|
| 2014/0161018 A1* | 6/2014 | Chang | H04B 7/0452 370/312 |
| 2016/0066143 A1* | 3/2016 | Dobyns | H04W 48/04 455/41.1 |
| 2019/0025401 A1* | 1/2019 | Vazhenin | H04W 64/00 |
| 2022/0057528 A1* | 2/2022 | Bennett | G01S 19/48 |

* cited by examiner

SECURE DATA TRANSMISSION SYSTEM AND METHOD FOR TARGETING SPECIFIC RECEIVER LOCATIONS

FEDERALLY-SPONSORED RESEARCH AND DEVELOPMENT

The United States Government has ownership rights in this invention. Licensing inquiries may be directed to Office of Research and Technical Applications, Naval Warfare Information Center, Pacific, Code 72120, San Diego, CA, 92152; telephone (619) 553-5118; email: niwc_patent.fct@us.navy.mil, referencing Navy Case 106,108.

FIELD OF THE INVENTION

The present disclosure pertains generally to a system and method for the secure reception of data via multiple transmitters targeting a specific receiver location, and more specifically, delayed and time multiplexed data.

BACKGROUND OF THE INVENTION

Typical wireless communication systems transmit signals into the air with little control of which receivers detect and collect the transmitted data. Various methods of securing transmission from unwanted detection or interception have been established, including encryption, reducing power levels, frequency spreading, and spatially isolating data transmission that aid in reducing data interception. Specifically, previous attempts at spatial isolation have involved either limiting the field of view with a directional antenna or reducing power. Improving spatial isolation to limit the reception of data to a single location is desirable for improving the security of wireless transmissions.

SUMMARY

A secure data transmission system, comprising a time multiplexer for receiving an input data stream and providing a plurality of output data streams, a time delay unit connected to the time multiplexer, a receiver tracker connected to the time delay unit for providing an instantaneous receiver location, and a plurality of transmitters connected to the time delay unit for transmitting the plurality of output data streams to a target receiver. A method for transmitting a data stream, comprising receiving an input data stream, multiplexing the input data steam to generate a plurality of output data streams, receiving at least one instantaneous receiver location, calculating a plurality of transmission ranges for each of the plurality of output data streams, wherein the calculation involves a plurality of transmission locations and an instantaneous receiver location, calculating a plurality of time delays for each of the plurality of output data streams, wherein each of the plurality of time delays comprises, determining each of the plurality of transmission ranges, determining the latency of each of the plurality of transmitters, delaying each of the plurality of output data streams according its calculated time delay, and transmitting each of the plurality of output data streams.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed system and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other system and methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
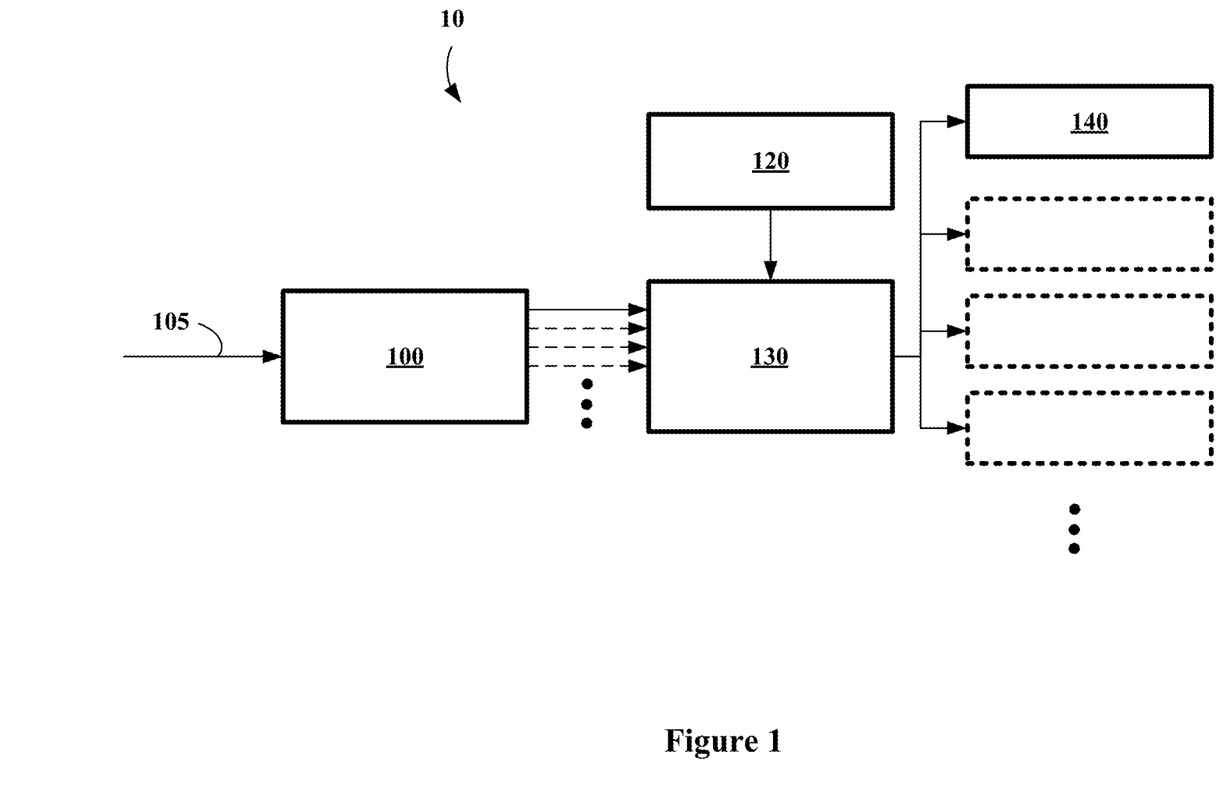
FIG. 1 is a block diagram of an example system for the secure reception of data.

FIG. 1 is a block-diagram illustration of an example secure data transmission system 10 for targeting specific receiver location that comprises, consists of, or consists essentially of a time multiplexer 100, a receiver tracker 120, a time delay unit 130, and a plurality of transmitters 140. The system for secure reception of data 10 may be used to transmit data to one, or a plurality of receivers, based on the specific location of the intended receivers. The system 10 provides spatial security for wireless data transmission in lieu of other security means. Such spatial security may be achieved by selectively allowing, in both bearing and range, a single point or plurality of points to correctly receive the wireless data transmission. Any receivers not located at the intended receiver location would not coherently receive the data transmission. There is a need for preventing common data transmission security threats which include, but are not limited to, interception and spoofing. Types of data transmission may include, but are not limited to bits, modulated baseband, and intermediate frequency data pulses. Data transmission may occur across many mediums including, but not limited to, radio waves, acoustics, light detection and ranging, optical, and broadband.

The secure data transmission system 10 may be used in any environment in which targeted data transmission is desired. Such circumstances may include when there is a need for spatial security, where the location of the data recipient is known. Further, the secure data transmission system may be used in combination with other security methods to add additional layers of security. For example, an additional digital key or orthogonal code may be needed to read the transmitted data at the receiver location.

The secure data transmission system 10 may also be used where the reuse of transmission frequencies is desired. Traditionally, data transmission functions by a receiver tuning into a selective channel. The instant disclosure makes possible the reuse of the frequency ranges because a plurality of transitions can be utilized on a single channel. Since, a transmission may only be coherently received in the location in which it is targeted, the same frequency channel can be reused for transmitting a multitude of signals without interference. Reuse of transmission frequencies is desirable for any high traffic communication network where the location of the receiver is known.

Figure 2:
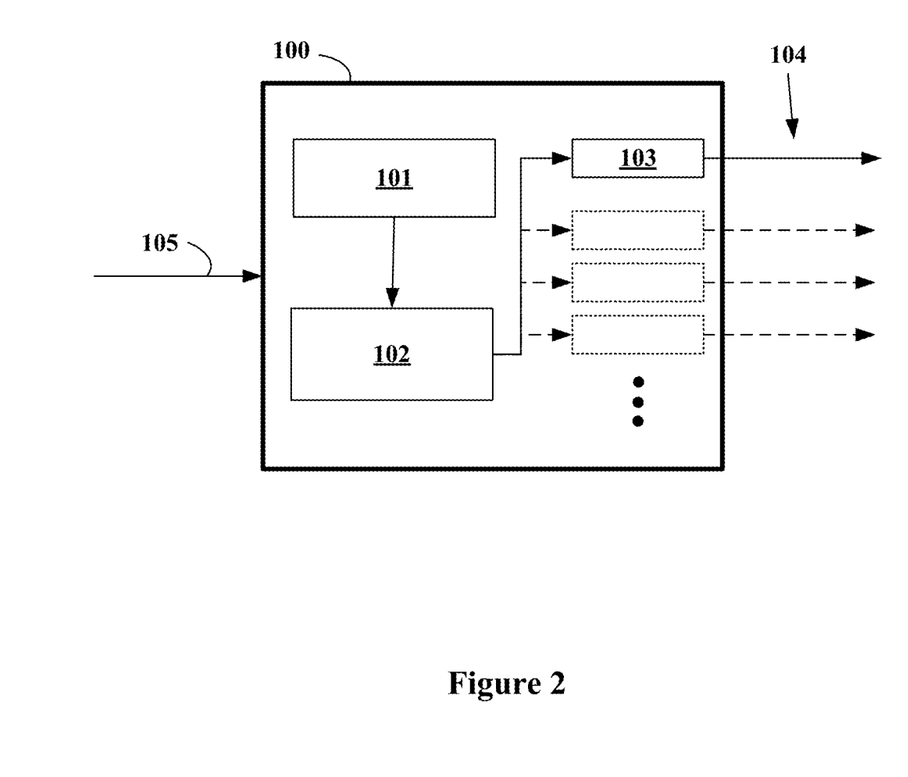
FIG. 2 is a block diagram of an example time multiplexer.

As shown in FIG. 2, a time multiplexer 100 comprises, consists of, or consists essentially of a multiplexing sequence 101, a multiplexing digital switch 102, and a plurality of empty vectors 103. The time multiplexer 100 receives an input data streams 105 and outputs a plurality of multiplexed output data streams 104. The multiplexing sequence 101 is random or preset pattern for multiplexing to the input data streams 105. The multiplexing digital switch 102 is any device capable of applying a multiplexing sequence 101 to the output data streams 105 to produce "N" number of output data streams 104, where "N" also corresponds to the number of empty vectors 103. Moreover, the multiplexing digital switch 102 then provides each of the plurality of outputs (1 to "N") to each of the "N" quantity of empty vectors 103. After the multiplexing digital switch 102 provides the plurality of output data streams 104, each of the plurality of empty vectors 103 comprise a single output data stream. In one embodiment, the quantity of empty vectors 103 "N" may also correspond to the number of transmitters 140 present in the secure data transmission system 10.

The receiver tracker 120 may provide an instantaneous location of the plurality of receivers to the time delay unit 130. The receiver tracker 120 may be any device that provides the intended receiver location to the time delay unit 130. In one embodiment, the receiver tracker 120 provides global positioning system (GPS) coordinates to the time delay unit 130. In another embodiment, the receiver tracker 120 provides a plurality of instantaneous receiver locations 134.

Figure 3:
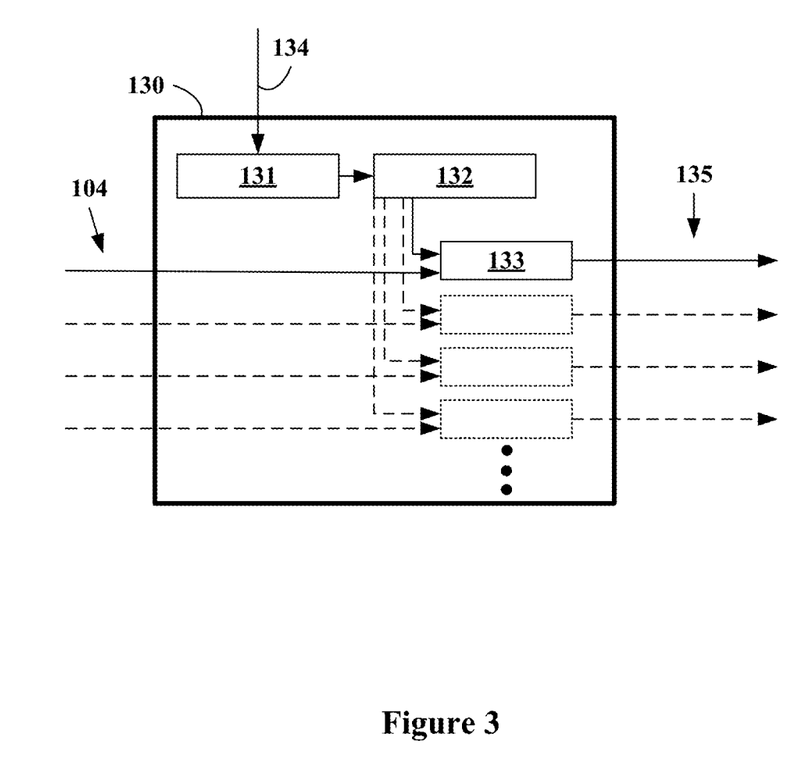
FIG. 3 is a block diagram of an example time delay unit.

As shown in FIG. 3, a time delay unit 130 comprises, consists of, or consists essentially of a range calculator 131, a delay estimator 132, a plurality of stream time delays 133, instantaneous receiver location 134, and delayed data streams 135. The range calculator 131 may receive the instantaneous receiver locations 134 of each of the plurality of receivers from the receiver tracker 120. The range calculator 131 may also calculate the distance between each of the plurality of receivers and each of the plurality of transmitters 140. Utilizing distance calculations, the delay estimator 132 may compute the time delays appropriate for each of the plurality of stream time delays 133 so as to align the transmission of each of the output data streams 104 for reception only at the desired receive location. After the delay estimator's 132 calculation, the plurality of stream time delays 133 are of a quantity ("N") which is equivalent to the number empty vectors 103. Each of the plurality of delayed data streams 135 comprise a multiplexed data stream, the corresponding time delay, and transmission latency information.

In one embodiment, the time delay unit 130 further comprises a phase alignment block. The phase alignment block may perform phase shifting to the plurality of output data streams 104. Phase shifting divides the input data stream 105 based on power, instead of a time window, while carrying the data from the original data stream. The phase shifted data streams may be transmitted and aligned for coherency at the discrete location of a receiver, or a plurality of receivers.

Each of the plurality of transmitters 140 may receive the stream time delays 133 and transmit the data to one receiver, or a plurality of receivers. The transmitters 140 are of any type capable of transmitting an output data stream 104 including, but not limited to, any generic or custom modulation and RF frond end combination. In one embodiment, an output data stream 104 comprises the multiplexed input data streams 105, time delay data, and latency data. In another embodiment, an output data stream comprises a phase shifted, multiplexed input data streams 105 and transmission latency data.

Figure 6:
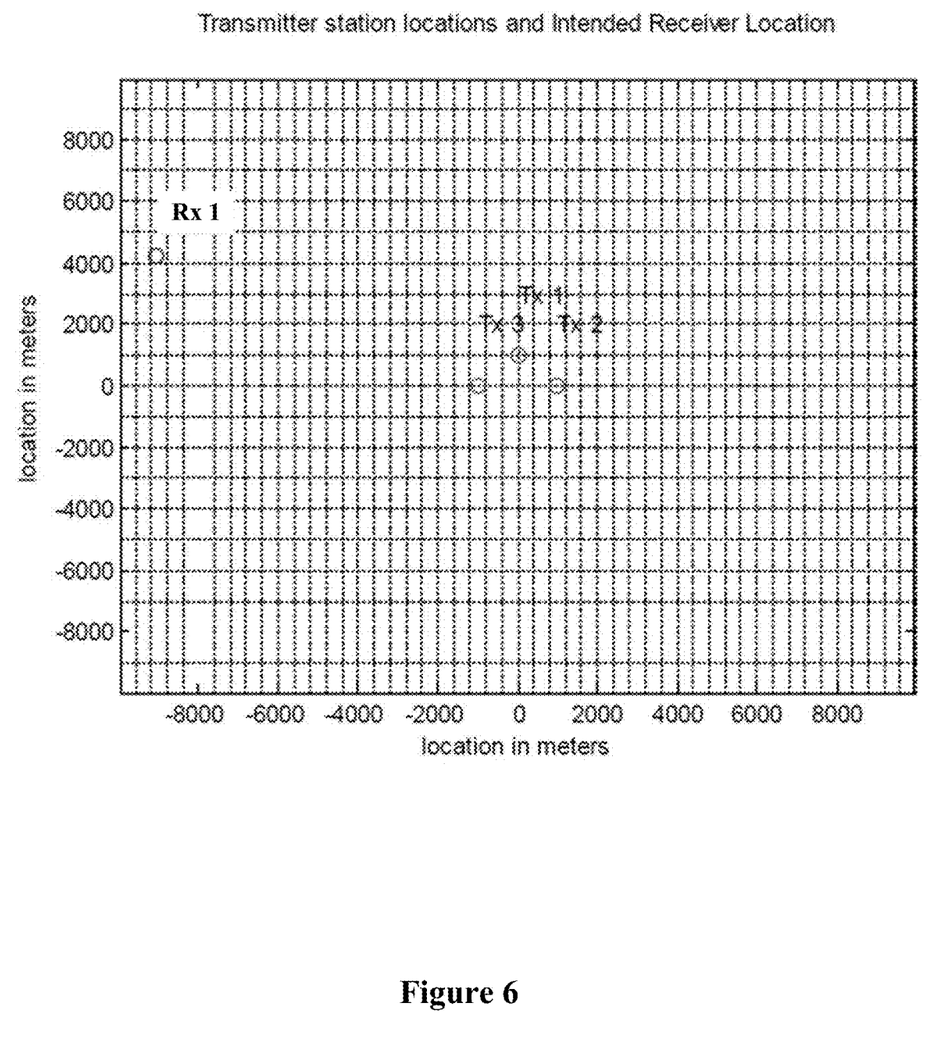
FIG. 6 is a graph illustrating an example of transmitter station locations and an intended receiver location.
Figure 7:
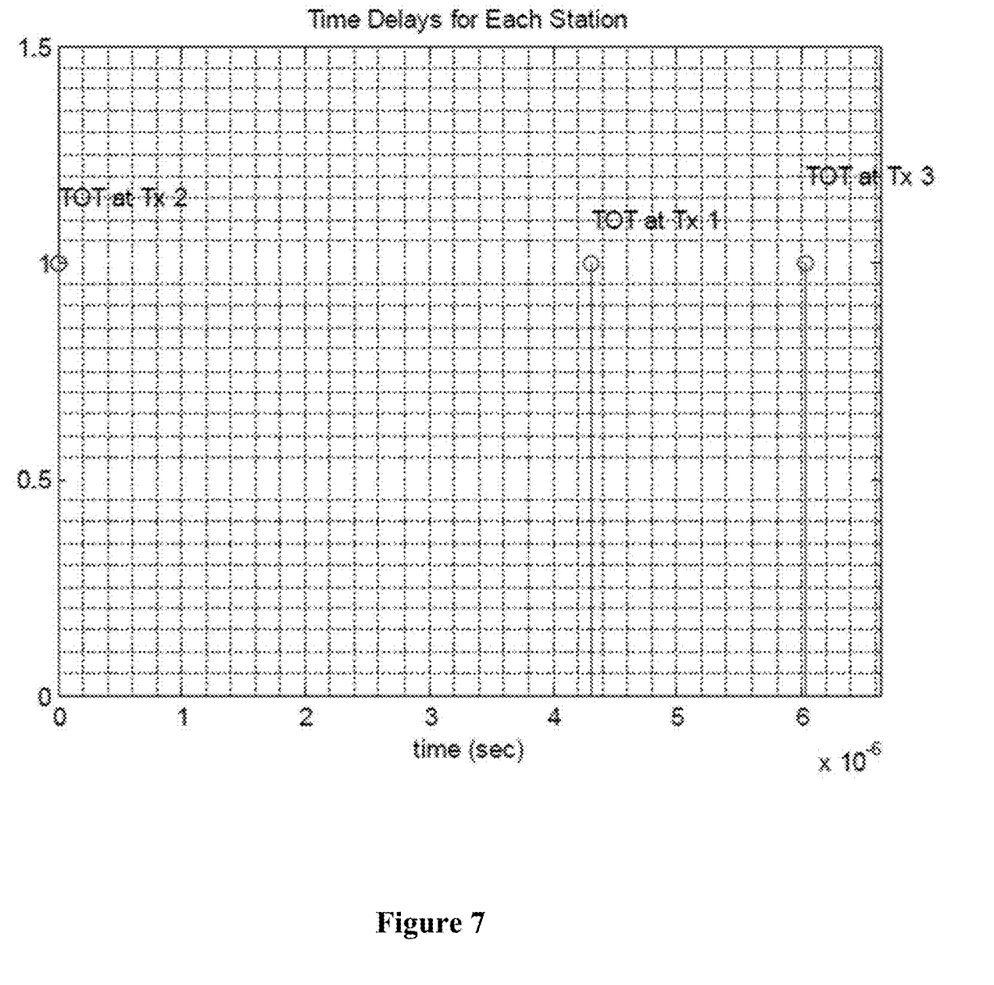
FIG. 7 is a chart illustrating an example time delay calculation for each transmitter station.

In one embodiment, the secure data transmission system 10 comprises at least three transmitters. The use of at least three transmitters enables accurate transmission in a three-dimensional environment. An example position of a three-transmitter system can be seen below in FIG. 6. Points in FIG. 6 labeled Tx 1, Tx 2, and Tx3 each represent one of the three transmitters 140 in an example embodiment of system 10. Additionally, an intended receiver is specified as Rx1 on the left side of the FIG. 6. FIG. 6 demonstrates an example arrangement of three transmitters 140 and a receiver. In this embodiment, each of the output data streams 104 require a unique time delay calculation based on the transmitter 140 and receiver location to correctly time align the intended sequence at the receiver location. The instantaneous receiver location 134 of the receiver Rx 1 are provided by the time delay unit 130 to the range calculator 131. The time delay may then calculated by the delay estimator 132. An example of a time delay calculation is presented in FIG. 7. As shown by FIG. 7, the time of transmission (TOT) is unique for each of the output data streams 104 at each transmitter. In this example, the (TOT) at Tx 2 having a time delay value of zero is representative of the delay of Tx 1 and Tx 3 being relative to Tx 2's transmission timing, but should not be construed as a limitation of this disclosure. The time delays may be capable of providing coherent alignment at the receiver. Further, although this embodiment is representative of a single receiver system, it should be understood that multiple receivers may be used as well as this example without departing from the scope of the claims.

Figure 8:
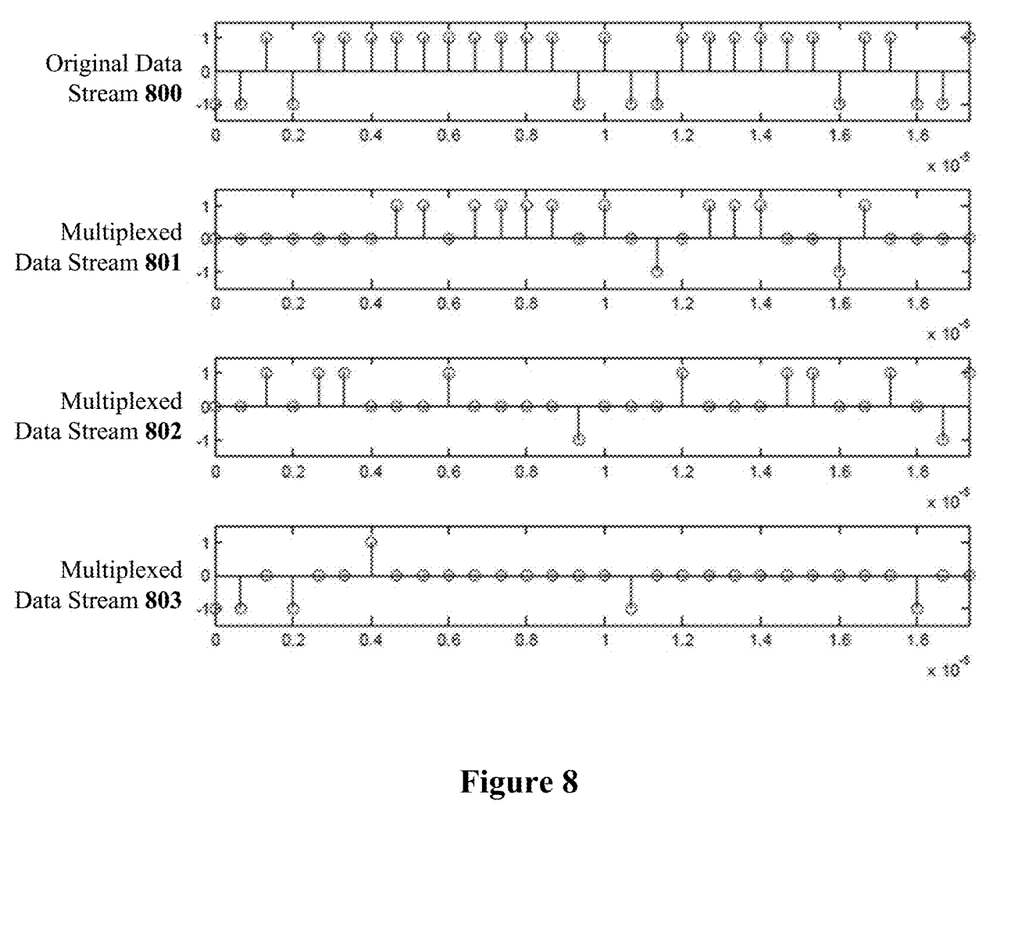
FIG. 8 is a chart illustrating an example of time multiplexing an original data stream into three multiplexed data streams.

Time multiplexing, performed by the time multiplexer 100, involves transmitting two or more digital signals over a common channel and shared medium. After time multiplexing occurs, the signals are individually transmitted and reassembled into their original format at the receiver. For example, FIG. 8 further demonstrates an example of time multiplexing an original data stream. In FIG. 8, the Original Data Stream 800 comprises an example original bit stream. Multiplexed stream 801, 802, and 803 comprise randomly multiplexed original bit stream data corresponding to each of the three transmitters. Each data bit from the Original Data Stream 800 exists on one of the Multiplexed streams 801, 802, or 803. When each of the multiplexed data streams are not given a time multiplexed data bit, they default to a zero value to ensure that their associated transmitter does not transmit in that time window. Then, each of the multiplexed data stream is transmitted by each of the plurality of transmitters 140 to an instantaneous receiver location 134. At the intended receiver, Multiplexed Streams 801, 802, and 803 are recombined to produce the Original Data Stream 800.

The instantaneous receiver location 134 may be any location that is discrete and know. For example, the location may be identified by its GPS coordinates. In one embodiment, the intended receiver may be a tower in a cellular network. In another embodiment, the intended receiver may be a network-connected vehicle. In another embodiment, the plurality of transmitters may target a plurality of receivers at discrete receiver locations. Targeting multiple receivers may be performed by generating multiple time windows so as to align the transmissions at each of the discrete receiver locations.

Figure 4:
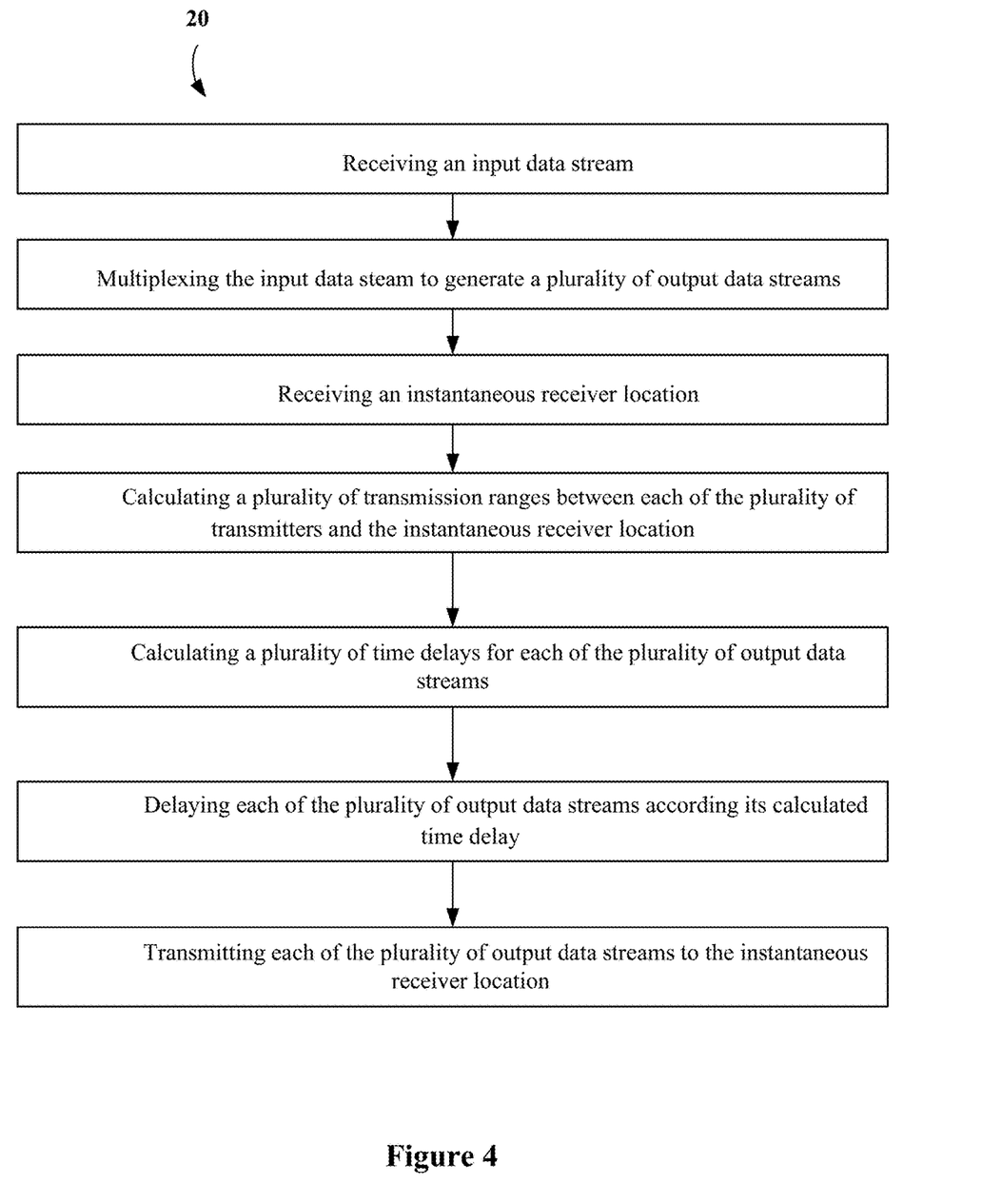
FIG. 4 is a flowchart illustrating operations of a method for targeting specific receiver location.

FIG. 4 is a method 20 for transmitting a data stream 20, which comprises, consists of, or consists essentially receiving an input data streams 105, multiplexing the input data steam to generate a plurality of output data streams 104, receiving an instantaneous receiver location 134, calculating a plurality of transmission ranges between each of the plurality of transmitters and the instantaneous receiver location 134, calculating a plurality of time delays for each of the plurality of output data streams 104, delaying each of the plurality of output data streams 104 according to each of the plurality of time delays, and transmitting each of the plurality of output data streams 104 to the instantaneous receiver location 134. The method 20 may also include, multiplexing the input data streams 105 according to a multiplexing sequence, dividing the input data streams 105 to the plurality of output streams, and providing the plurality of output data stream to the plurality of empty vectors.

Figure 5:
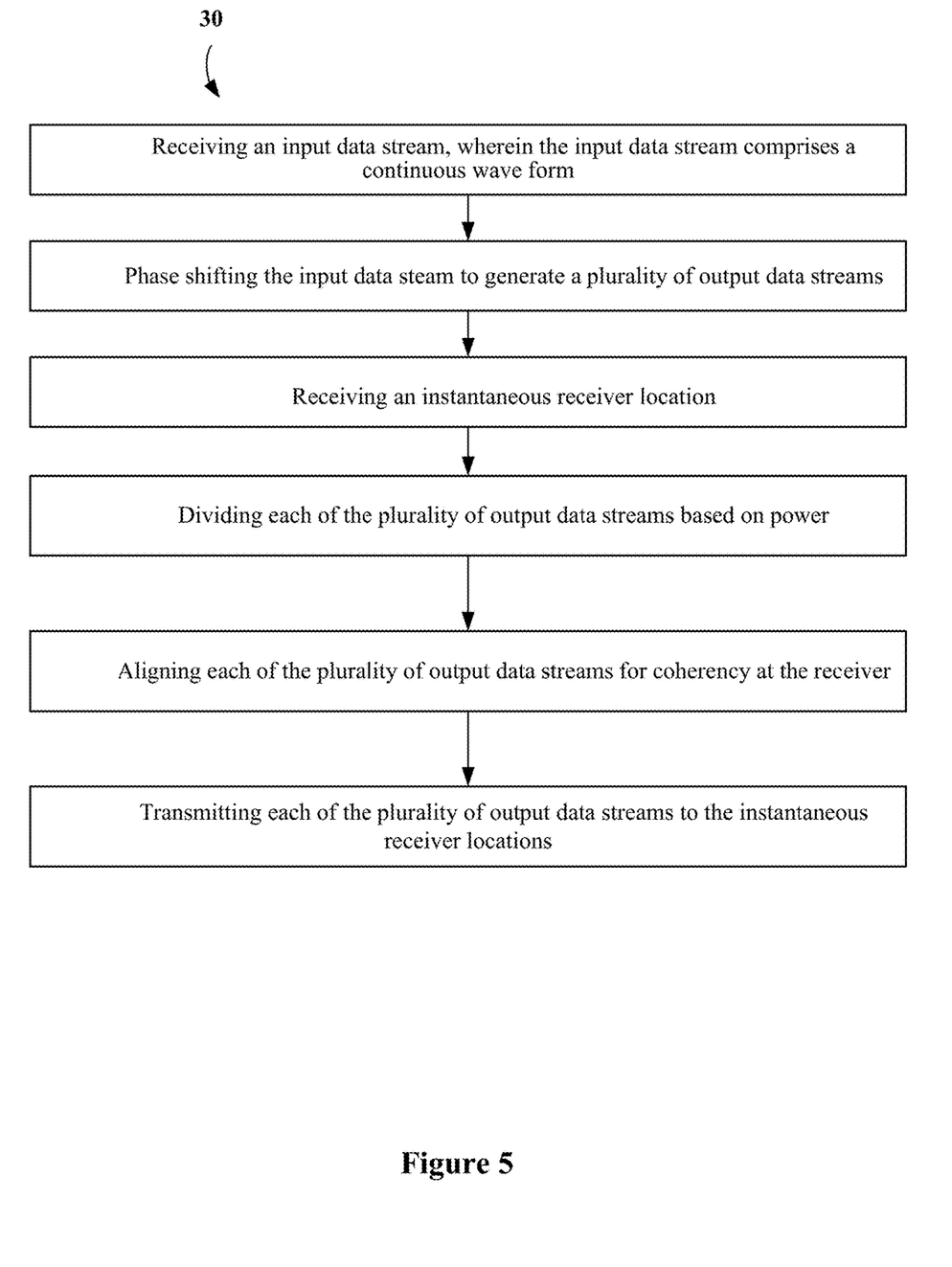
FIG. 5 is a flowchart illustrating operations of a method for targeting specific receiver location involving phase shifting.

FIG. 5 is a method 30 for transmitting a data stream involving phase shifting, comprising, consisting of, or consisting essentially of receiving an input data streams 105, wherein the input data streams 105 comprises a continuous wave form, phase shifting the input data steam to generate a plurality of output data streams 104, receiving an instantaneous receiver location 134, dividing each of the plurality of output data streams 104 based on power, aligning each of the plurality of output data streams 104 for coherency at the receiver, and transmitting each of the plurality of output data streams 104 to the instantaneous receiver location 134. The method 30 may also include receiving a plurality of instantaneous receiver locations 134, and transmitting each of the plurality of output data streams 104 to each of the plurality of instantaneous receiver locations 134.

From the above description of secure data transmission system and method for targeting specific receiver locations, it is manifest that various techniques may be used for implementing the concepts of secure data transmission system 10, secure data transmission method 20, and secure data transmission method involving phase shifting 30 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the secure data transmission system 10, secure data transmission method 20, and secure data transmission method involving phase shifting 30 is not limited to the particular embodiments described herein, but is capable of many embodiments without departing from the scope of the claims.

We claim:

1. A secure data transmission system, comprising:
   a time multiplexer for receiving an input data stream and providing a plurality of output data streams, and further comprising:
      a multiplexing sequence for multiplexing the input data stream,
      a multiplexing digital switch for receiving the input data stream and dividing the input data steam into the plurality of output streams, and
      a plurality of empty vectors for conveying the plurality of output data streams;
   a time delay unit connected to the time multiplexer, wherein the time delay unit delays each of the plurality of output data streams for alignment only at an instantaneous receiver location, and further comprising:
      a range calculator for calculating distances between each of the plurality of transmitters and the instantaneous receiver location,
      a delay estimator connected to the range calculator, and
      a plurality of stream time delays connected to the delay estimator;
   a receiver tracker connected to the time delay unit for providing the instantaneous receiver location, wherein the instantaneous receiver location is global positing system coordinates;
   a plurality of transmitters connected to the time delay unit for transmitting the plurality of output data streams to the instantaneous receiver location; and
   a phase alignment block for phase shifting the input data stream, wherein the input data stream is a coherent waveform.

2. The secure data transmission system of claim 1, wherein the time delay unit further comprises:
   a range calculator for calculating distances between each of the plurality of transmitters and the instantaneous receiver location;
   a delay estimator connected to the range calculator; and
   a plurality of stream time delays connected to the delay estimator.

3. The secure data transmission system of claim 1, wherein the input data stream is of a type selected from the group consisting of continuous waveform, pulsed waveform, radar, optical transmission, and acoustic transmission.

4. The secure data transmission system of claim 1, wherein the plurality of transmitters comprise at least three transmitters.

5. The secure data transmission system of claim 1, wherein the receiver tracker connected to the time delay unit provides a plurality of instantaneous receiver locations, wherein each of the plurality of transmitters transmit to each of the plurality of instantaneous receiver locations.

6. The secure data transmission system of claim 1, further comprising:
   a receiver for receiving the plurality of output data streams.

7. The secure data transmission system of claim 1, wherein the instantaneous receiver location is associated with a node in a cellular network.

8. The secure data transmission system of claim 1, wherein the instantaneous receiver location is associated with a network-connected vehicle.

* * * * *